US005325668A

United States Patent [19]

Walchhutter et al.

[11] Patent Number: 5,325,668

[45] Date of Patent: * Jul. 5, 1994

[54] METHOD AND APPARATUS FOR HYDRAULIC PRESSING

[75] Inventors: Ulrico Walchhutter, Piazza Giolitti 6, Milano; Renato Bossetti, Novara, both of Italy

[73] Assignees: S.I.T.I. Societa Impianti Termoelettrici Industriali S.p.A.; Ulrico Walchhutter, Milan, Italy

[ * ] Notice: The portion of the term of this patent subsequent to May 21, 2002 has been disclaimed.

[21] Appl. No.: 962,318

[22] Filed: Oct. 16, 1992

Related U.S. Application Data

[62] Division of Ser. No. 623,946, Dec. 6, 1990, Pat. No. 5,158,723.

[30] Foreign Application Priority Data

| | | | |
|---|---|---|---|
| Jun. 10, 1988 | [IT] | Italy | 20936 A/88 |
| Jun. 10, 1988 | [IT] | Italy | 20937 A/88 |
| Jan. 26, 1989 | [IT] | Italy | 19203 A/89 |

[51] Int. Cl.[5] ........................ F16D 31/02; B29C 43/58

[52] U.S. Cl. .......................................... 60/413; 60/420; 264/40.5; 264/65; 425/149; 425/352

[58] Field of Search .................. 60/413, 414, 416, 418, 60/420, 422, 431, 452; 264/65, 122, 123, 40.5; 100/269 R, 270; 72/453.11; 425/149, 352, 419

[56] References Cited

U.S. PATENT DOCUMENTS

| | | | |
|---|---|---|---|
| 3,069,742 | 12/1962 | Walchhutter | 25/45 |
| 3,359,608 | 12/1967 | Walchhutter | 25/45 |
| 4,363,612 | 12/1982 | Walchhutter | 425/167 |
| 4,459,807 | 7/1984 | Koppen | 60/452 |
| 4,515,181 | 5/1985 | Dezelan | 60/452 X |
| 4,625,513 | 12/1986 | Glomeau | 60/431 |
| 4,706,930 | 11/1987 | Lexen | 60/413 X |
| 4,864,994 | 9/1989 | Myers | 60/431 X |
| 5,158,723 | 10/1992 | Walchhutter et al. | 264/40.5 |
| 5,184,466 | 2/1993 | Schniederjan et al. | 60/452 X |

*Primary Examiner*—Richard A. Bertsch
*Assistant Examiner*—Hoang Nguyen
*Attorney, Agent, or Firm*—Wolf, Greenfield & Sacks

[57] ABSTRACT

In a hydraulic circuit a positive-displacement pump has a flywheel. An actuation motor is attached to the positive displacement pump. The pump is capable of directing liquid flow either towards the tank or towards a hydraulic cylinder. The control of flow direction is determined by a first valve which is connected on the output side of the pump in order to discharge the flow of the positive displacement pump either to the tank or to the cylinder. The opening speed of the first valve is controlled. A bistable valve feeds the pilot line of the first valve. A distribution valve, connected with the output side of the pump feeds two pressure lines.

43 Claims, 8 Drawing Sheets

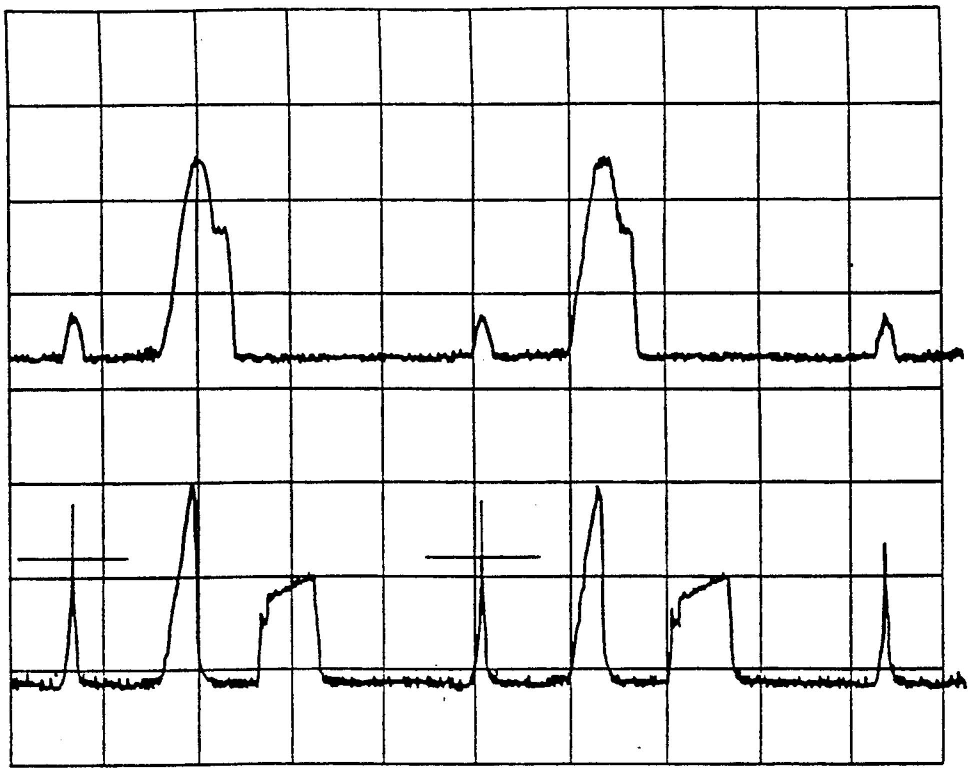
FIG.10
FIG.11
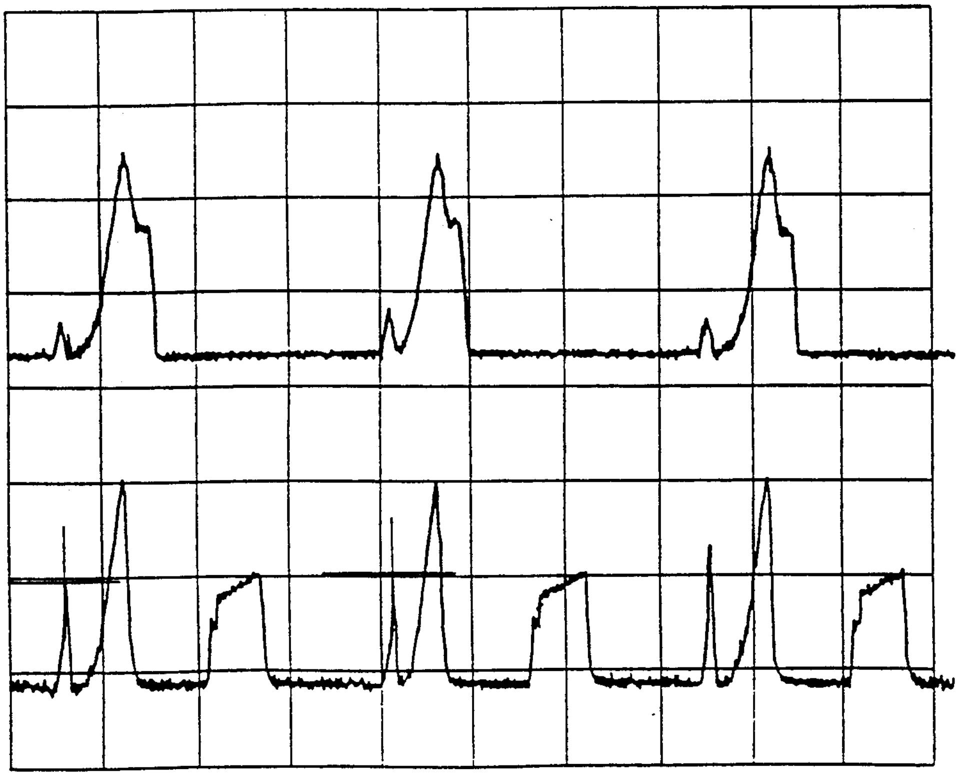

METHOD AND APPARATUS FOR HYDRAULIC PRESSING

This application is a divisional application of co-pending U.S. patent application Ser. No. 07/623,946 now U.S. Pat. No. 5,158,723 filed Dec. 6, 1990, the entire contents of which are incorporated herein by reference.

FIELD OF THE INVENTION

The present invention relates to a hydraulic pressing apparatus, for exerting pressure on the bodies to be processed by virtue of hydraulic actuation means.

The bodies to be processed are ceramic tiles, ceramic plates and ceramic refractory bricks, or are made for example of the following materials, taken individually or in mixtures or in compounds with one another: metals, oxides or other metallic compounds, polymers, elastomers, carbon, biological materials of plant or animal origin, waste materials, special ceramic materials. Said materials may be in aggregate, granular, pulverized, solid, fluid or semi-fluid form. The term "special ceramic materials" defines all ceramic materials, except for ceramic plates, ceramic tiles and ceramic refractory bricks.

A preferred body to be processed is formed by pulverized solid ceramic material (in powder or granules), with low humidity, preferably up to 8%, which is compacted during the pressing operation so as to obtain a preformed solid body in the required shape, which is then sent to the successive thermal cooking operation.

Hydraulic actuation means for pressing are generally formed by one or more hydraulic cylinders. Hydraulic auxiliary actuation means, formed by hydraulic cylinders or motors, are furthermore often necessary.

Hydraulic devices in the field of the invention operate with an open hydraulic circuit, while hydraulic devices with closed hydraulic circuit do not relate to the field of the present invention. For the purposes of the present invention, a hydraulic circuit is termed open if the liquid, after working in the actuation means and before returning to the pump, is sent to a connecting line which is open towards the tank, while a hydraulic circuit is termed closed if the liquid, after working in the actuation means, returns directly to the pump and has no open connection towards the tank. The liquid is generally hydraulic oil.

Hydraulic devices in the field of the invention comprise: a positive-displacement pump operating with a direction of flow directed towards a delivery line, preferably with a flow-rate which is always substantially greater than zero, an actuation motor for the positive-displacement pump having a flywheel for accumulating kinetic energy, a tank for the liquid, with which the intake of the positive-displacement pump and the discharge of the hydraulic actuation means are connected, first directional control valve means connected to the delivery line in order to discharge the flow of the positive-displacement pump to the tank.

The term "directional control valve means" defines valve means which offer, in their open position, the minimum load loss and the maximum flow-rate.

The closure of said first valve means sends the flow of the positive-displacement pump to the hydraulic actuation means. The opening of the first valve means sends the flow of the positive-displacement pump to the tank. The flywheel accumulates kinetic energy during the open times of the first valve means and yields kinetic energy during the closure times of said first valve means.

The hydraulic devices In the field of the invention have the purpose of eliminating conventional hydraulic presses, which do not relate to the field of the invention. Conventional hydraulic presses in fact operate with a throttling valve connected to the delivery of the pump so as to discharge to the tank the excess flow always at maximum pressure, so that the pump constantly operates at its maximum pressure. Since the maximum flow and pressure are in any case insufficient for the actual pressing work, the pressing flow and pressure are reached by using hydraulic accumulators and pressure multipliers. Though said conventional hydraulic presses are by far the most widespread, they entail high power consumption, overheating of the liquid, high pressure hammers and reduced controllability of the speed of their movements. Other conventional hydraulic presses attempt to reduce power consumption without discharging the pump's total flow to the tank, using variable-displacement pumps and a flywheel to vary the flow from zero to maximum during each pressing cycle, so that power consumption is substantially nil when the flow is zero. This last solution, however, entails low speeds and high costs and low reliability for the pumps.

Hydraulic devices in the field of the invention therefore have the aim of using the flywheel as an accumulator of kinetic energy, in order to reduce the power rating and the electric power consumption of the motor, so that when the total flow of the pump Is sent to the discharge the flywheel accumulates kinetic energy, while when the flow of the pump is sent to the hydraulic actuation means the flywheel yields kinetic energy to the pump and therefore to the liquid in order to provide the actual pressing work. In this manner an attempt is made to achieve an important saving in electric power and a considerable reduction in the heating of the liquid by friction, since all the saved energy would have been otherwise converted into heat and yielded to the liquid. In theory the obtainable energy saving can reach 65% up to 90%.

The above summarizes the main field of industrial application of the invention; said field, however, is not a limitation of its scope, since the apparatus according to the invention, in particular as described and claimed hereafter, may be advantageously used in any other equivalent field in which pressure is exerted on said bodies to be processed.

Device of this kind are known, for example described in the German patent application No. 1627843 filed in 1970, in which a hydraulic press comprises first directional control valve means which are formed by a four-way, three-position valve connected to the delivery line.

Said known devices, however, have some problems: first of all they are reliable only when they operate with a very low maximum work pressure, in the range of a few bars or tens of bars. In practice, if higher pressures are used, unsolvable problems arise, such as very high instantaneous unexpected overpressures which lead to the breakage of an element of the hydraulic circuit, often the pump itself, thus causing the leakage of the liquid. This makes these devices dangerous as well as industrially unreliable. Such unexpected overpressures are allowed by the great amount of energy stored in the flywheel, which can be entirely transferred almost instantly to the liquid and be converted into a sharp rise in pressure. The use of the pressure control safety valve does not solve these problems at all and in the best of cases causes the discharge of the flywheel, which must therefore be restarted anew.

Since the pump's power consumption is proportional to the generated pressure, the energy saving and the prevention of the liquid's overheating are all the more important as the maximum work pressure is high. The above described devices are therefore most desirable indeed for those values of maximum operating pressure for which in practice they become unreliable and dangerous.

Said known devices are furthermore generally very slow, and are absolutely unable to attain the speed of conventional hydraulic presses.

Due to these disadvantages, known devices which belong to the field of the present invention have had no commercial success and have been completely neglected by users, though they were disclosed in 1970, so that the theoretically obtainable energy saving is non-existent in practice.

SUMMARY OF THE INVENTION

The aim of the present invention is therefore to eliminate the above described disadvantages with a hydraulic apparatus capable of operating with great reliability and without danger with a maximum operating pressure in excess of 100 bar and preferably in excess of 200 bar, capable of reaching even much higher values, in excess of 300 bar, and with pressing forces in excess of 30 tons, preferably in excess of 100 tons.

An object of the invention is to allow a high operating speed, which is absolutely comparable and even higher than that of conventional hydraulic presses, without requiring continuous throttling of the flow at maximum pressure, hydraulic accumulators and pressure multipliers, thus improving performance and efficiency and reducing system costs.

Another object of the invention is to allow a real saving in energy consumption comprised between 65% and 90%, a 40% reduction of the motor's installed power, a reduction of the volume of cooling water in excess of 75% up to more than 90% with respect to conventional hydraulic presses of equivalent capability.

Another object of the invention is to allow to control the speed of the hydraulic actuation means, in particular of the speed of approach to the bodies to be worked, by means of modulating valves, and to control the pressing speed by means of the flow-rate of the pump, avoiding pressure hammers and allowing a soft and smooth operation of the various moving parts, which is particularly important for pressing pulverized ceramic material.

Another object of the invention is to avoid the overheating of the liquid, in particular locally, so as to allow the use of modulating (proportional) valves to control the auxiliary hydraulic actuation means and the closed-loop adjustment systems. The flow-rate of the oil through modulating valves is in fact inversely proportional to the viscosity, which for example in lubricating (castor) oil is 986 $10^{-3}$ kg/m.s at 20° C. and 231 $10^{-3}$ kg/m.s at 40° C. This means that the heating of the oil for example from 20° C. to 40° C. entails a fourfold increase in the flow-rate of the oil through a modulating valve, all adjustment conditions being equal. Since modulating valves and closed-loop controls act on the flow-rate, the non-uniformity of the temperature, viscosity and therefore of the flow-rate makes it impossible to reliably use these adjustment systems. Said systems are however very desirable, since they allow to control the speeds and accelerations of the hydraulic actuation means, eliminating pressure hammers, and allow a simplification of the adjustment of the press, so as to allow even night-time operation without the presence of expert personnel.

Another object of the invention is to simplify the hydraulic circuit, reducing the number of its components and their cost, the need for maintenance, and increasing their life, allowing for example the use of a single constant-flow positive-displacement pump, allowing to protect the pump, so that it is not always subject to the maximum load and is not subject to overheating and to lack of lubrication, and furthermore allowing a long life-time and stable good conditions of the hydraulic oil.

Yet another object of the invention is to allow the high-precision setting of the speeds, pressures and movements of the moving parts.

According to a first aspect of the invention, there is provided a hydraulic pressing apparatus which comprises a first remotely controllable pilot line for said first valve means; said first valve means comprising: a poppet which is slidable inside a seat, to perform a closure stroke and an opening stroke; said poppet having: a first end shaped so as to engage and close a passage of the liquid-flow and an opposite end adapted to be loaded by the pressure of said first pilot line; so that the closure force is proportional to the pressure of the pilot fluid; and so that the closure of said first valve means can directly cause the actuation of said hydraulic actuation means, said flywheel accumulating kinetic energy during the open times of said first valve means and yielding kinetic energy during the closure times of said first valve means.

According to a second aspect of the invention, there is provided a hydraulic pressing apparatus in which said first valve means comprise a poppet which is slidable inside a seat, so as to close an oil flow passage with a force which is proportional to the pilot pressure; so that the closure of said first valve means can directly cause the actuation of said hydraulic actuation means, said flywheel accumulating kinetic energy during the open times of said first valve means and yielding kinetic energy during the closure times of said first valve means.

According to a third aspect of the invention, there is provided a hydraulic pressing apparatus in which said outlet of said hydraulic actuation means comprises outlet valve means, said first valve means being structurally independent from said outlet valve means, so that the closure of said first valve means can directly cause the actuation of said hydraulic actuation means, said flywheel accumulating kinetic energy during the open times of the first valve means and yielding kinetic energy during the closure times of said first valve means.

DETAILED DESCRIPTION OF THE DRAWINGS

Further characteristics and advantages of the invention will become apparent from the description of a preferred but not exclusive embodiment of the hydraulic apparatus, illustrated only by way of non-limitative example in the accompanying drawings, wherein:

FIGS. 6 to 11 are operating charts of the apparatus according to the invention.

DETAILED DESCRIPTION OF THE INVENTION

Figure 1:
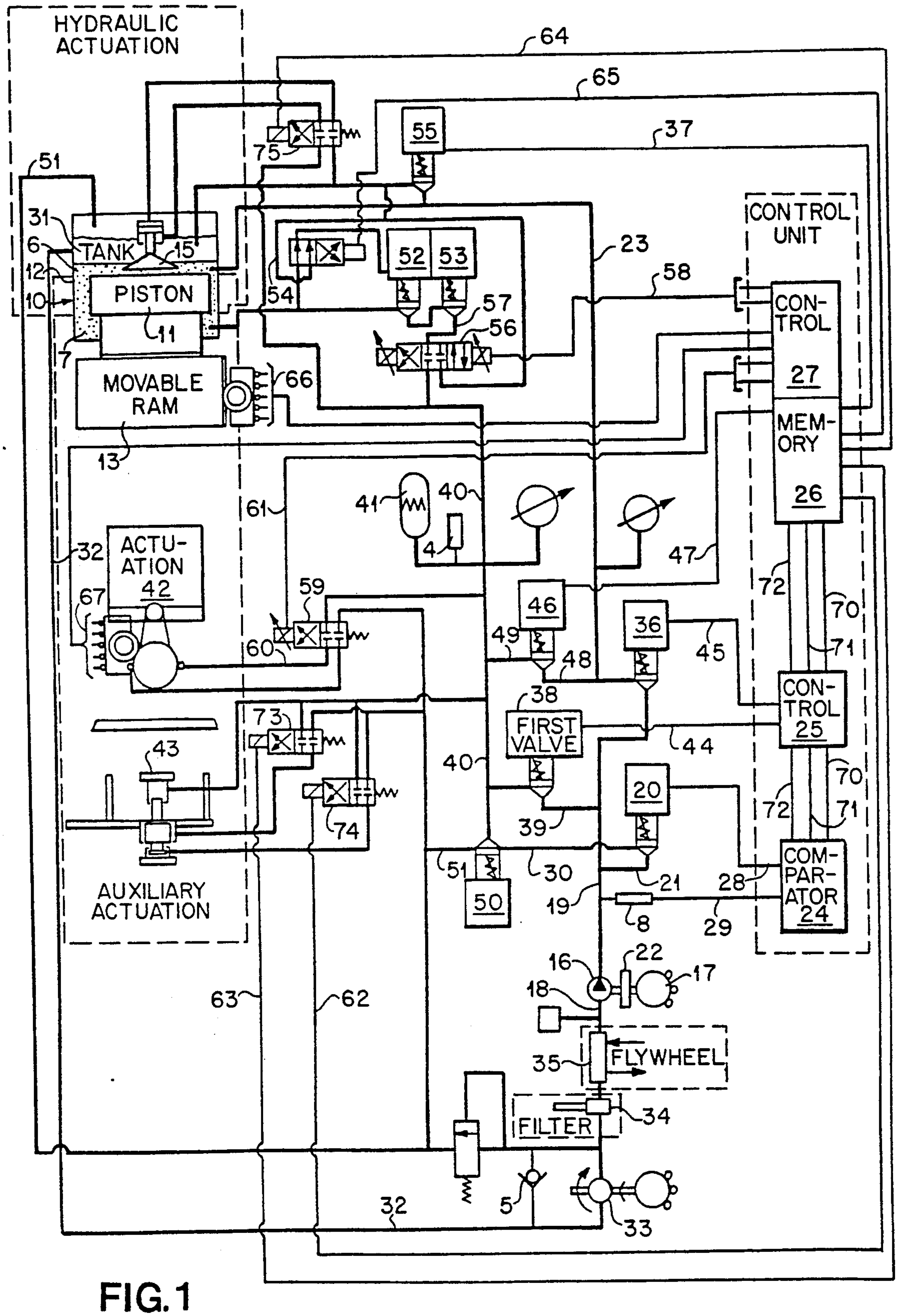
FIG. 1 is a schematic view of the apparatus according to the invention.

With reference to FIGS. 1 to 5, the open hydraulic circuit comprises the tank 31, the line 32, the centrifugal pump 33, the filter 34, the heat exchanger 35, the intake 18 of the positive-displacement pump 16, the positive-displacement pump 16, the pressure lines 19 and 23, the hydraulic actuation means 10 and the valve 15. The tank 31 is slightly pressurized to stop dust from entering the circuit.

The centrifugal pump has, for example, a head of 6 bar and has the exclusive purpose of compensating the load losses due to the filter 34 and to the heat exchanger 35, in order to avoid the cavitation of the pump 16. Check valve means 5 are arranged in parallel to the centrifugal pump 33 and are open towards the positive-displacement pump 16. The check valve means 5 operate in the case of an unexpected lack of electric power, when the centrifugal pump 33 stops and the positive-displacement pump 16, connected to the flywheel 22, continues to rotate. The positive-displacement pump 16 operates with a single flow direction, towards the delivery line 19, with a flow-rate which is preferably always substantially greater than zero.

The positive-displacement pump 16 preferably has a substantially constant flow-rate during each pressing cycle. If it is prioritary to achieve maximum possible reliability and modest costs, the positive-displacement pump 16 has a fixed displacement. The positive-displacement pump 16 may have for example a maximum head of 420 bar. The hydraulic actuation means 10 comprise a piston 11, a cylinder 12, and a rear chamber 6. The valve 15 connects the tank 31 and the rear chamber 6 and thus forms the outlet of the hydraulic actuation means 10. However, during the operation the valve 15 can allow also a preliminary feed at low pressure of the hydraulic actuation means 10; after such preliminary feed, the valve 15 closes, so as to allow high pressure actuation of the hydraulic actuation means. The hydraulic actuation means 10 actuates a movable ram 13, which supports the punches 14 of the molds. The open hydraulic circuit operates with a maximum work pressure in excess of 100 bar and preferably in excess of 200 bar.

The motor 17 for the actuation of the positive-displacement pump 16 is an asynchronous electric motor and has a flywheel 22 for storing kinetic energy. Said flywheel 22 is preferably connected directly to the shaft of the pump 16 by means of an elastic joint 9 and has a sufficiently high moment of inertia and angular speed so that the decrease in the number of rotations of the flywheel during each closure of the first directional control valve means 20 is not higher than 10% and preferably than 5% of the number of rotations in the full-power condition, which occurs during the opening of the first directional control valve means.

The first directional control valve means 20 are connected to the delivery line 19 by means of the line 21 and when they are open they discharge the total flow of the delivery line 19 to the discharge line 30, 51 which is openly connected to the tank 31.

The first pilot line 80 of the first directional control valve means 20 can be remotely controlled. The first directional control valve means 20 comprise a poppet 110 which is slidable inside the seat 111 so that it can perform a closure stroke and an opening stroke. The poppet 110 has a first end 112 with a tapered profile, so as to engage and close an opening 113 for the passage of the liquid, and an opposite end 114 adapted to be loaded by the pressure of the first pilot line 80 by means of the line 116. The thrust for the closure of the opening 113 exerted by the first end 112 of the poppet 110 is thus directly proportional to the pressure of the pilot fluid.

The first pilot line 80 comprises first pilot means 82 formed by a two-position directional control valve which can be electrically remotely controlled by means of the line 28 connected to the control unit 24, 25, 26 and 27. The output 83 of the first pilot means 82 is connected to the tank 31. The actuation of the first pilot means 82 actuates the closure stroke of the poppet 110. The feed of the first pilot line 80 comprises primary throttling means 84, formed by an orifice, to limit the losses of pressurized liquid through the first pilot means 82 when said first pilot means 82 are not in their actuation position.

The connection between the first pilot line 80 and the opposite end 114 of the poppet 110 comprises secondary throttling means 86, formed by an orifice, to control the speed of the opening stroke of the poppet 110 in response to the end of the actuation of the first pilot means 82. The connection between the first pilot line 80 and the opposite end 114 of the poppet 110 comprises a check valve 87 which is open towards the opposite end 114 and is arranged in parallel to the secondary throttling means 86, to allow a high speed of the closure stroke of the poppet 110 in response to an actuation of the first pilot means 82.

The first pilot line 80 preferably comprises second safety pilot means 88 with a pressure control valve, the output 89 whereof is connected to the tank 31; the second pilot means 88 discharge the first pilot line 80 into tank 31 when a preset maximum pressure value is reached.

Preferably the first pilot line 80 is fed by the delivery line 19, more preferably by means of bistable valve means 90 with two inputs 91 and 92, respectively connected to a hydraulic accumulator 41 and to the delivery line 19.

For the purposes of the present invention, the term "bistable valve means" defines means equivalent to two check valves arranged in parallel and open towards the opposite end 114 of the poppet 110, each having an independent input of its own. In this manner, the input at the highest pressure determines the actual pilot pressure at all times. In practice the bistable valve means are provided for example by means of a single chamber with two oppositely arranged inputs and a central output. Said chamber contains a ball which closes the input at lower pressure.

The delivery line 19 is connected to the hydraulic actuation means 10 by a first pressure line 23 and by dedicated check valve means 81, 36. The check valve means 81, 36 are opened towards the hydraulic actuation means 10, i.e. they allow the flow of liquid from the pump towards the chamber 6 and prevent its flow in the opposite direction. The check valve means 81, 36 isolate the pressure line 23 and protect the hydraulic circuit arranged upstream from the enormous amount of energy stored in the hydraulic actuation means 10 during pressing.

Preferably the delivery line 19 is connected to the hydraulic actuation means 10 by a plurality of pressure lines, for example two pressure lines 23 and 40, and by a remotely controllable distribution valve unit formed by dedicated check valves 81, 36 and dedicated check valves 100, 38 to send the flow of the positive-displacement pump 16 to the particular pressure line 23, 40 to be loaded. More preferably, for every particular pressure line 23 or 40 the distribution valve unit comprises dedicated valve means 36 or 38 for directional control, which are connected to the delivery line 19, are respectively controlled by means of a dedicated pilot line 93 or 94 and can be remotely actuated to open or close that particular pressure line. Each of the dedicated valve means 36 or 38 comprises a poppet 110 which is slidable inside a seat 111 to perform a closure stroke and an opening stroke. The poppet 110 has: a first end 112 shaped so as to engage and close a passage opening 113 for the liquid and an opposite end 114 adapted to be loaded by the pressure of the dedicated pilot line 93 or 94, so that the closing force of the opening 113 is proportional to the pressure of the pilot fluid.

Figure 2:
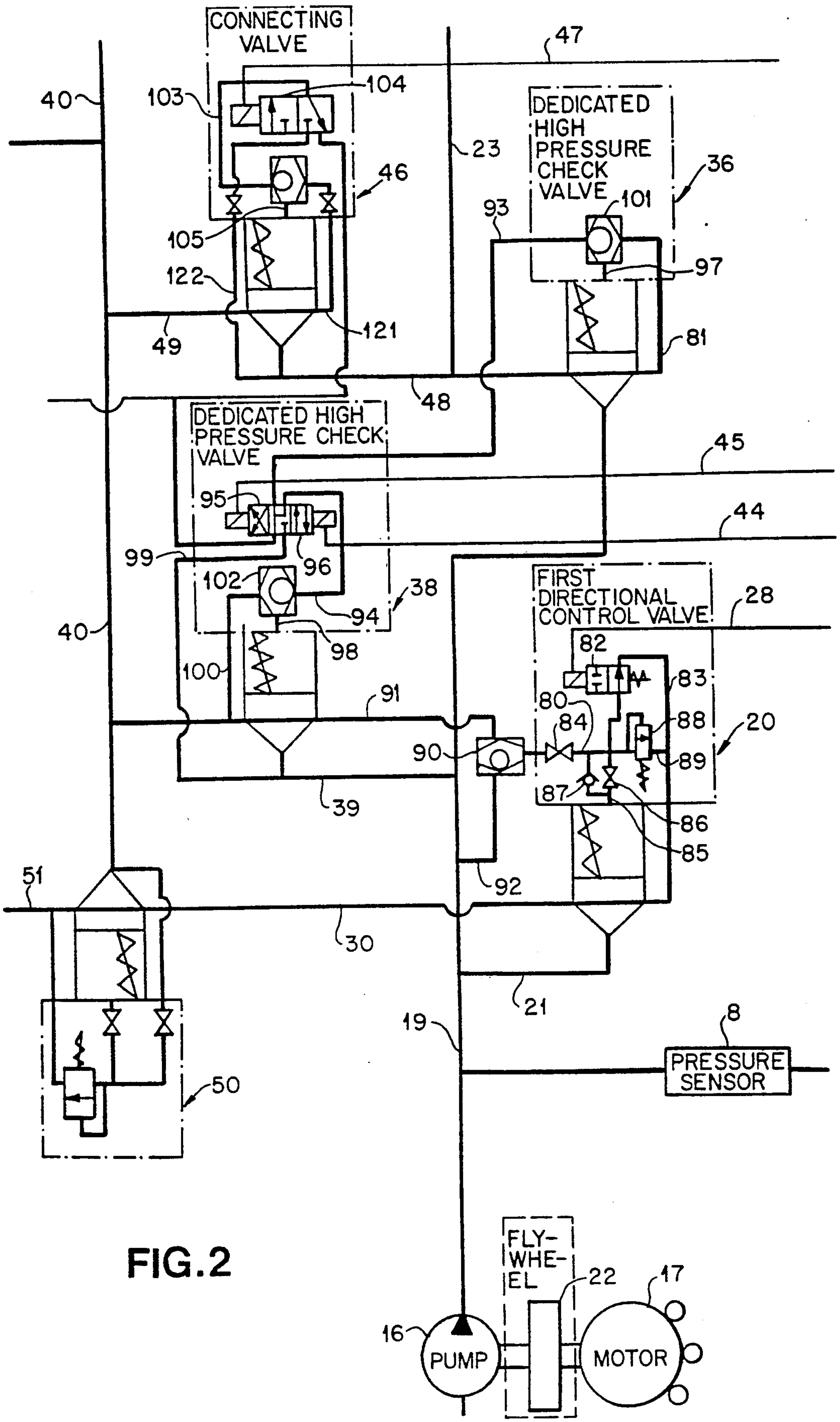
FIG. 2 is an enlarged detail view of FIG. 1.

Each dedicated pilot line 93 or 94 comprises third pilot means 95 or 96 which are provided with a directional control valve and can be remotely controlled by means of the digital lines 45 or 44. The output of the third pilot means 95 or 96 is connected to the opposite end 114 of the poppet 110 of the dedicated valve means 36 or 38. The actuation of the third pilot means 95 or 96 actuates the closure stroke of the poppet 110. Each dedicated pilot line 93 or 94 is fed by the delivery line 19. With particular reference to FIG. 2, the third pilot means 95 and the third pilot means 96 are materially combined into a single four-way, three-position valve, but two separate three-way two-position valves could be used in an equivalent manner.

The check valve means preferably comprise an actuation line 81 or 100 which is respectively connected to the dedicated valve means 36 or 38 for each pressure line 23 or 40. In particular, the actuation line 81 connects the pressure line 23 to the opposite end 114 of the poppet 110 of the dedicated valve means 36, while the actuation line 100 connects the pressure line 40 to the opposite end of the poppet 110 of the dedicated valve means 38, in order to protect the hydraulic circuit arranged upstream. The opposite end 114 of the poppet 110 of the dedicated valve means 36 is preferably fed through the duct 97 by means of bistable valve means 101 which have two inputs respectively connected to the dedicated pilot line 93 and to the actuation line 81, while the opposite end 114 of the poppet 110 of the dedicated valve means 38 is fed, through the duct 98, by virtue of bistable valve means 102 with two inputs which are respectively connected to the dedicated pilot line 94 and to the actuation line 100.

The pressure line 23 is at high pressure and provides the maximum pressing pressure threshold which is achieved in the upper chamber 6. The pressure line 40 is at low pressure and is used to actuate auxiliary actuation means 7, 42, 43. The low-pressure line 40 comprises a hydraulic accumulator 41.

The connecting valve means 46 mutually connect the high-pressure line 23 and the low-pressure line 40 and can perform their function before and/or after pressing, as required. In particular, after pressing, the connecting valve means 46 allow to transfer liquid from the high-pressure line 23 to the low-pressure line 40 so as to recover the energy stored in the high-pressure line 23, charging the hydraulic accumulator 41. Before pressing the connecting valve means 46 allow to transfer liquid from the low-pressure line 40 to the high-pressure line 23 to accelerate the preliminary loading of the high-pressure line 23 by means of the energy stored in the hydraulic accumulator 41.

The connecting valve means 46 are of the directional control type, are controlled by a fourth pilot line 103 and may be remotely controlled. They comprise a poppet 110 which is slidable inside a seat 111 to perform a closure stroke and an opening stroke. The poppet 110 has a first end 112 shaped so as to engage and close a passage opening 113 for the liquid and an opposite end 114 adapted to be loaded by the pressure of the fourth pilot line 103. The closure force of the opening 113 is proportional to the pressure of the pilot fluid. The fourth pilot line 103 comprises fourth pilot means 104 with a directional control valve which can be electrically remotely controlled by means of the line 47 and have their output connected to the opposite end 114 of the poppet 110 of the connecting valve means 46. The actuation of the fourth pilot means 104 controls the closure stroke of the poppet 110 of the connecting valve means 46. With particular reference to FIG. 2, the illustrated configuration allows only the transfer of liquid from the high-pressure line 23 to the low-pressure line 40. However, it is sufficient to reverse the destination of the lines 121 and 122 to obtain the above described reverse function of high-pressure line 23 preliminary loading.

Figure 3:
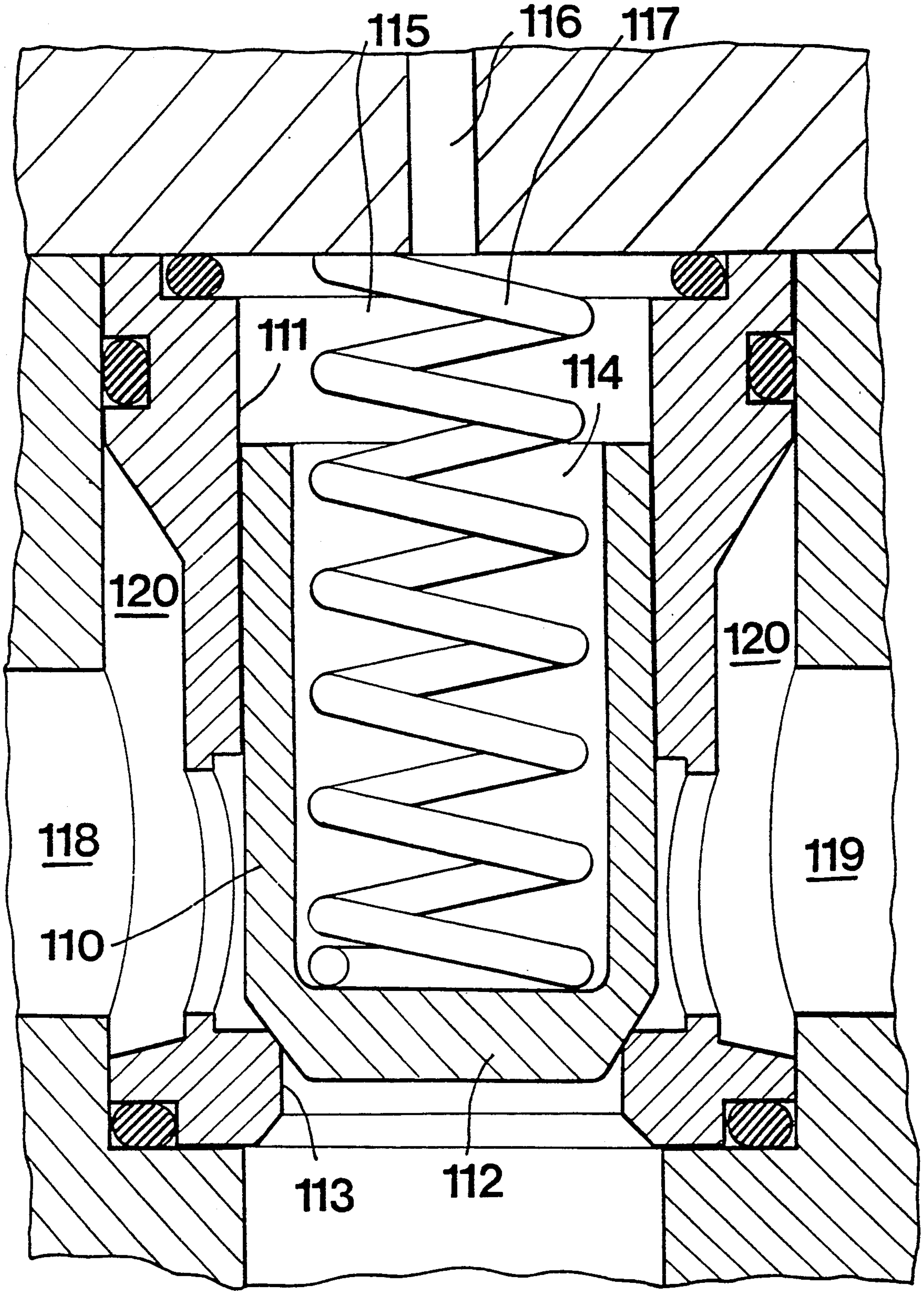
FIG. 3 is a sectional view of the valve means of FIG. 2.
Figure 4:
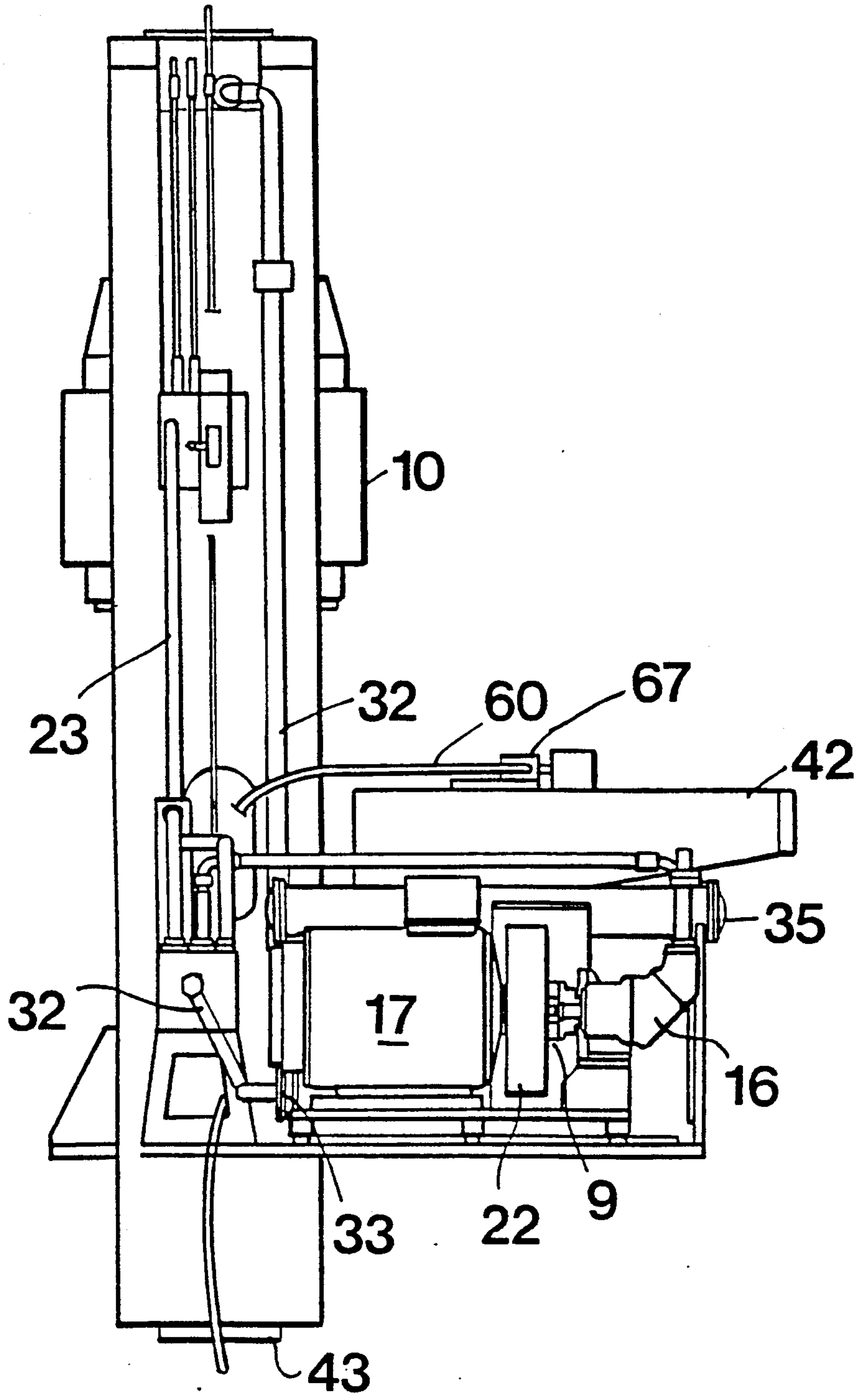
FIG. 4 is a lateral view of the apparatus according to the invention.
Figure 5:
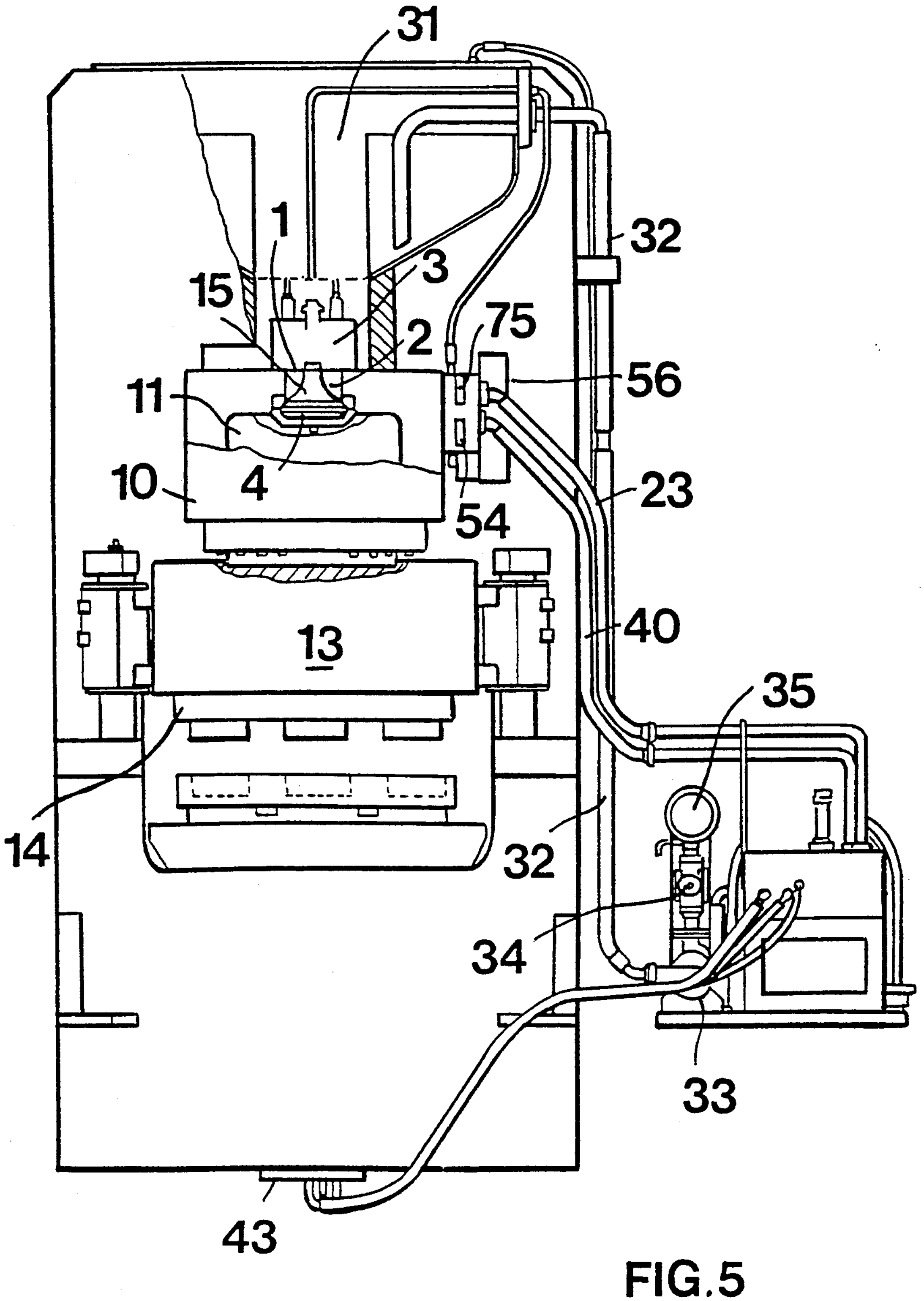
FIG. 5 is a front view of the apparatus of FIG. 4.

With particular reference to FIGS. 2 and 3, in general the first valve means 20, the dedicated valve means 36 and 38 and the connecting valve means 46 are of the two-way, two-position kind. In particular, the two positions correspond to the opening and closure strokes of the poppet 110, and the two ways correspond respectively one to the opening 113 and the other one to the openings 118 and 119. In order to simplify the drawing, two openings 118 and 119 are illustrated instead of a single one. However the two openings 118 and 119 are equivalent to a single one, infact they are always connected to one another through the annular chamber 120, regardless of the position of the poppet 110. Thus, with reference to FIG. 2, the lines 83 and 30 are always mutually connected, as well as 81 and 48, as well as 91 and 110, as well as 30 and 51. In practice it may be often preferable to provide a single opening 118 or 119 and connect to the other line independently from the annular chamber 120. The passage opening 113 is arranged on a plane which is perpendicular to the direction of the stroke of the poppet 110. The first end 112 of the poppet 110 is tapered, for example conical, and engages a complementary configuration on the opening 113. In particular, the pilot cross section of the poppet 110 (corresponding to the cross section of the opposite end 114) is greater than the closure cross section (corresponding to the cross section of the passage opening 113).

With reference to FIG. 3, the poppet 110 is shown at the end of its closure stroke. At rest, elastic means, formed for example by the spring 117, keep the poppet 110 slightly pushed towards the passage opening 113. In any case the thrust of the spring 117 is negligible with respect to the thrust of the pressure of the pilot fluid.

The pressure of the pilot fluid corresponds to the pressure of the delivery line 19 when the pressing pressure in chamber 6 is greater than the pressure of the hydraulic accumulator 41 and the pressure of the pilot fluid corresponds to the pressure of the hydraulic accumulator 41 when the pressing pressure is lower than the pressure of the hydraulic accumulator 41.

With reference to FIG. 1, the flow of liquid arriving from the hydraulic accumulator 41 to actuate the auxiliary actuation means 7, 42 is controlled by a dedicated modulating valve 56, 59 for each of the auxiliary actuation means 7, 42. Said modulating valve is controlled by the control unit.

The control unit 8, 24, 25, 26 and 27 controls the pressing cycle and comprises: a pressure sensor 8 connected to the analogic line 29, memory means 26 for storing at least one pressure threshold, comparator means 24 for comparing the values detected by the sensor 8 to said threshold and control the opening of the first valve means 20 when the values detected by the sensor 8 reach said threshold.

The pressure sensor 8 is arranged along the path of the liquid between the positive-displacement pump 16 and the hydraulic actuation means 10 and is preferably arranged between the positive-displacement pump 16 and the check valve means 36, 81. A second sensor 4 is arranged along the low-pressure line 40 to detect the charge condition of the accumulator 41.

Preferably the comparator means 24 are provided by means of dedicated microcircuits capable of rapidly comparing the analogic signals arriving from the sensor 8. The digital line 28 connects the comparator means 24 to the first pilot means 82 of the first valve means 20.

The memory means 26 preferably allow to store a plurality of different pressure thresholds, so that at least one pressure threshold corresponds to each pressure line 23, 40. The memory means 26 furthermore preferably comprise a database which comprises the data (positions, times, pressures and temperatures) of various pressing cycles for different operating conditions.

The control means 27 control the movements of the hydraulic actuation means, for example of the ram 13 and of the actuation means 42, and in particular they process the pulse signals arriving from the encoders 66 and 67 and compare them to the data stored for that particular pressing cycle. On the basis of this comparison, the control means 27 modulate the analogic control signals 58 and 61 to the modulating valves 56 and 59 and thus provide a closed-loop adjustment.

The control unit furthermore comprises control means 25 to control the distribution valve unit 36 and 38 by means of the digital lines 44 and 45. The combined control of the distribution valve unit 36, 38 and of the first valve means 20 allows to load the pressure lines 23, 40 each at a different pressure, corresponding to the respective pressure threshold.

The lines 28, 44, 45, 47, 37, 64 and 65 are electric lines which connect the control unit to the pilotings of the poppet valve means.

The memory means 26, the control means 25 and the comparator means 24 are connected through the lines 70, 71, 72, each of which transmits a pressure threshold at the preset moment of the cycle of the press.

The operation is as follows: initially, as soon as the pumps 16 and 33 are started, the pressure lines 23 and 40 are without pressure and the delivery line 19 is subject to a very low pressure which is determined by the resistance which the liquid encounters in flowing through the first valve means 20 to reach the tank 31 along the line 30, 51. The first pilot means 82 are not actuated, the first pilot line discharges into the tank 31 along the line 83 and thus the liquid only encounters the weak resistance due to the spring 117, which is easily overcome and produces only very small load losses which are negligible in the general economy of the apparatus.

When the memory means 26 enable the charging of the accumulator 41, the control means 25 send a digital activation signal to the solenoid of the third pilot means 95 through the line 45 and an analogic signal of memorized pressure level for the accumulator to the comparator means 24. When they receive the analogic signal, the comparator means 24 send an activation signal to the first pilot means 82. The actuation of the first pilot means 82 determines the rise of the pilot pressure and actuates the closure stroke of the poppet 110 of the first valve means 20, while the actuation of the third pilot means 95 actuates the closure stroke of the poppet of the valve means 36 dedicated to the high-pressure line 23. The flow of the pump can no longer be discharged into the tank 31 and cannot flow towards the high-pressure line 23, since these outlets are now closed. Only one path is therefore left open, through the dedicated valve means 38 to the low-pressure line 40. All the other valves of the line 40 are closed and the accumulator 41 is thus charged.

When the analogic signal of the pressure sensor 8, sent to the comparator means 24 through the line 29, equals the analogic pressure level signal memorized for the accumulator 41, the comparator means 24 send to the control means 25 a signal indicating the pressure has been reached and simultaneously interrupt the activation signal to the solenoid of the first pilot means 82. The pressure of the first pilot line 80 is thus discharged to the tank 31, and the poppet performs its opening stroke under the thrust of the pressure at the passage opening 113. The flow of the pump 16 can again discharge into the tank 31, and the pressure in the delivery line 19 drops again to the low values determined by the negligible load losses of the first valve means 20, in the open times. The dedicated check valve means 38, 100 of the low-pressure line 40 prevent the liquid loaded into the accumulator 41 from returning towards the delivery line. In particular, the actuation line 100 actuates, through the bistable valve means 102, the closure stroke of the poppet of the valve means 38 dedicated to the low-pressure line 40. The secondary throttling means 86 control the speed of the opening stroke of the poppet of the first valve means 20 and thus control the rate of pressure decrease in the delivery line 19. Said rate must be controlled, in order to give the dedicated check valve means 100, 38 the time to intervene, so as to prevent pressure hammers on the delivery line 19. The charge of the accumulator 41 is used to actuate the auxiliary hydraulic actuation means 7, 42, 43. The above indicated sequence for charging the accumulator 41 is repeated at each pressing cycle. When the press is motionless but active, the pressure sensor 4 requests the control unit for a recharge when the pressure drops to the minimum allowed value.

When the memory means 26 enable the loading of the high-pressure line 23, valve 15 is opened. By opening the valve 15, the piston 11 is allowed to move forward by means of its own weight or by means of auxiliary actuation means (not shown) so as to allow fast filling of the cylinder 12 with the oil contained in the tank 31. Then the valve 15 is closed. The reversal of the destinations of the lines 121 and 122 of the connecting valve means 46 is optionally actuated beforehand, and the poppet of said connecting means 46 begins the opening stroke and loads the line 23 with the pressure of the accumulator 41. The control means 25 then actuate the fourth pilot means 104, closing the poppet of the connecting valve means 46, actuate the third pilot means 96 and send to the comparator means 24 a stored pressure level signal for pressing. When they receive the signal, the comparator means 24 send an actuation signal to the first pilot means 82 and therefore actuate the closure stroke of the poppet 110 of the first valve means 20, while the actuation of the third pilot means 95 actuates the closure stroke of the poppet of the valve means 38 dedicated to the low-pressure line 23. The flow of the pump 16 can now move only through the valve means 36 dedicated to the high-pressure line 23. The valve 55 is closed and the upper chamber 6 is charged, thus performing the pressing.

When the signal of the pressure sensor 8 equals the stored pressure level signal for pressing, the comparator means 24 send a signal indicating pressure has been achieved to the control means 25 and simultaneously interrupt the actuation signal to the solenoid of the first pilot means 82. The pressure of the first pilot line 80 is therefore discharged into the tank 31 and the poppet performs the opening stroke. The flow of the pump 16 is discharged to the tank 31. The dedicated check valve means 36, 81 of the high-pressure line 23 prevent the return of the liquid loaded in the line 23 towards the delivery line. In particular the actuation line 81 actuates, by means of the bistable valve means 101, the closure stroke of the poppet of the valve means 36 dedicated to the high-pressure line 23. The secondary throttling means 86 control the speed of the opening stroke of the poppet of the first valve means 20 to give the dedicated check valve means 36, 81 the time to intervene so as to avoid pressure hammers on the delivery line 19.

Once the pressing has been completed, the destinations of the lines 121 and 122 are in the position indicated in FIG. 2, the excitation of the solenoid of the fourth pilot means is halted, the poppet begins its opening stroke, and part of the energy stored in the line 23 is transferred to the line 40, charging the accumulator 41. The line 23 is then discharged into the tank 31 by means of the valve means 55. By opening the valve 15, the piston 11 is allowed to move backwards by means of the auxiliary actuation means 7 to initiate a new pressing cycle.

With reference to FIGS. 6 to 11, the preferred application of the invention to the dry pressing of pulverized ceramic material, to obtain pre-formed parts suitable for baking, is illustrated.

Figure 6:
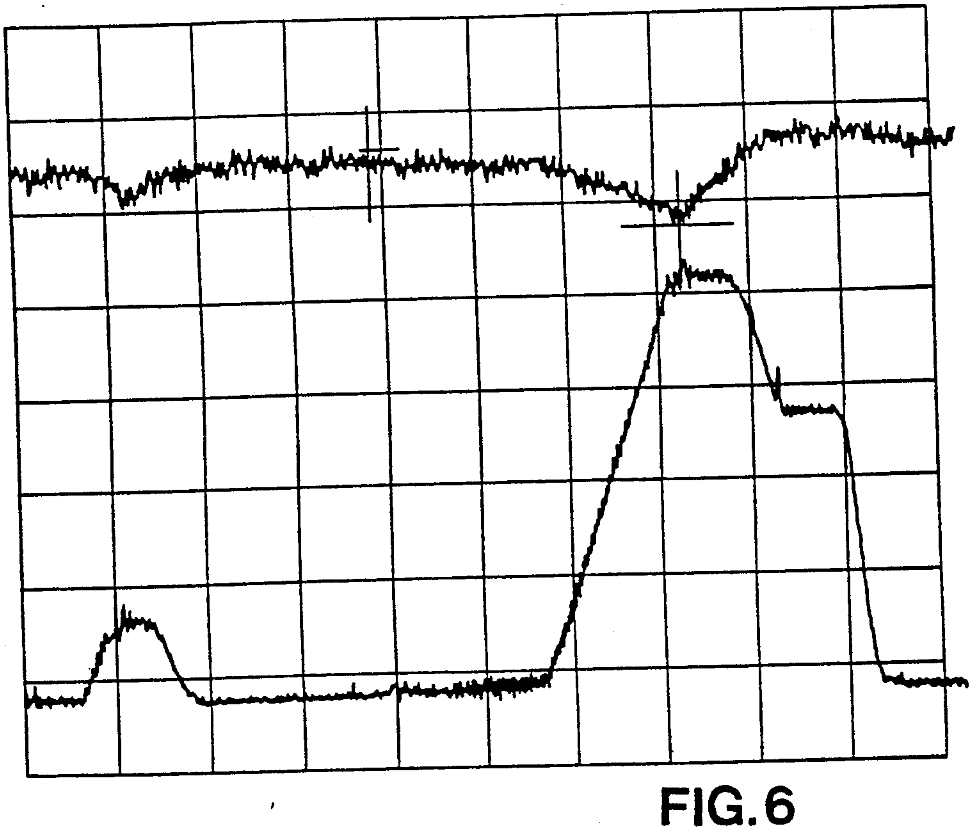
Figure 7:
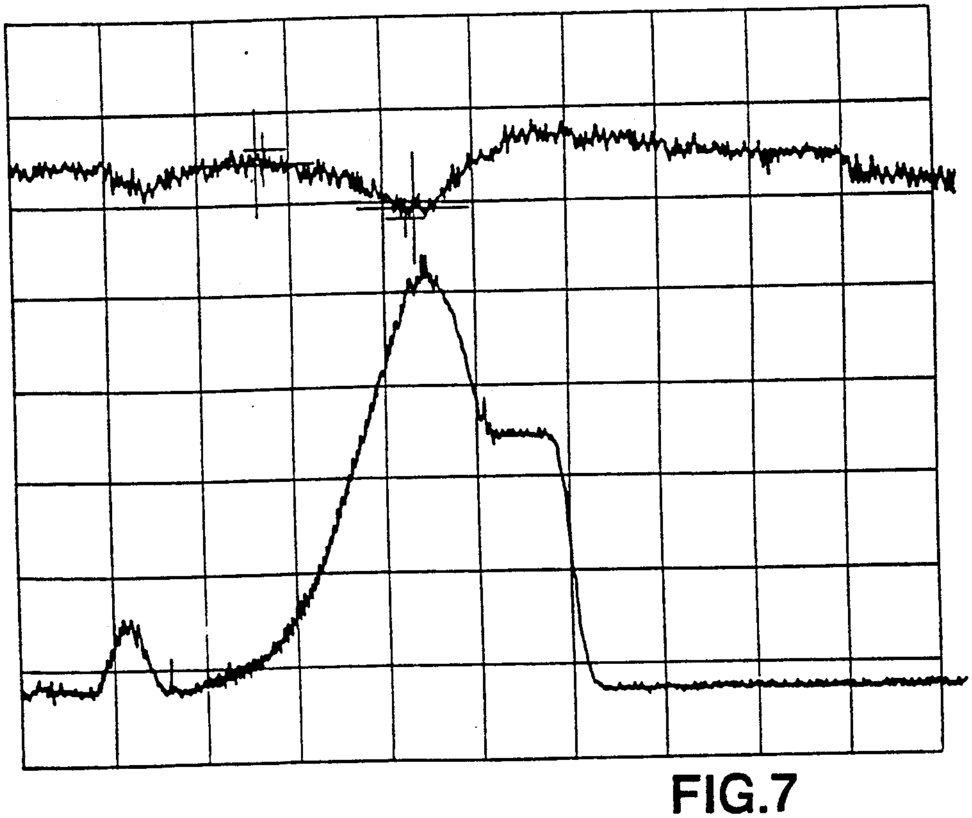

The curve shown in the lower part of FIGS. 6 and 7 represents the value of the pressures taken along the high-pressure line 23 as a function of time. The unit of measurement indicated on the axis of the ordinates is 70 bar; the unit of measurement indicated on the axis of the abscissas is 0.2 seconds. The corresponding simultaneous curve shown in the upper part of FIGS. 6 and 7 represents the value of the flywheel's speed as a function of time. The unit of measurement indicated on the axis of the ordinates is 68 rpm; the unit of measurement indicated on the axis of the abscissas is 0.2 seconds. The average angular speed of the flywheel is 1,500 rpm. The first pressing stroke is performed at reduced pressure to pre-compact and de-aerate the ceramic powder. The second pressing stroke is performed at high pressure for final compacting. The drops in the flywheel's speed are always lower than 4.5% of the average speed. After the maximum value of high pressure, the curves drop, and each curve has a stationary portion at an intermediate pressure, which represents the intervention of the connecting valve means 46 to recover the energy gathered in the high-pressure line 23 in order to partially charge the accumulator 41.

Figure 8:
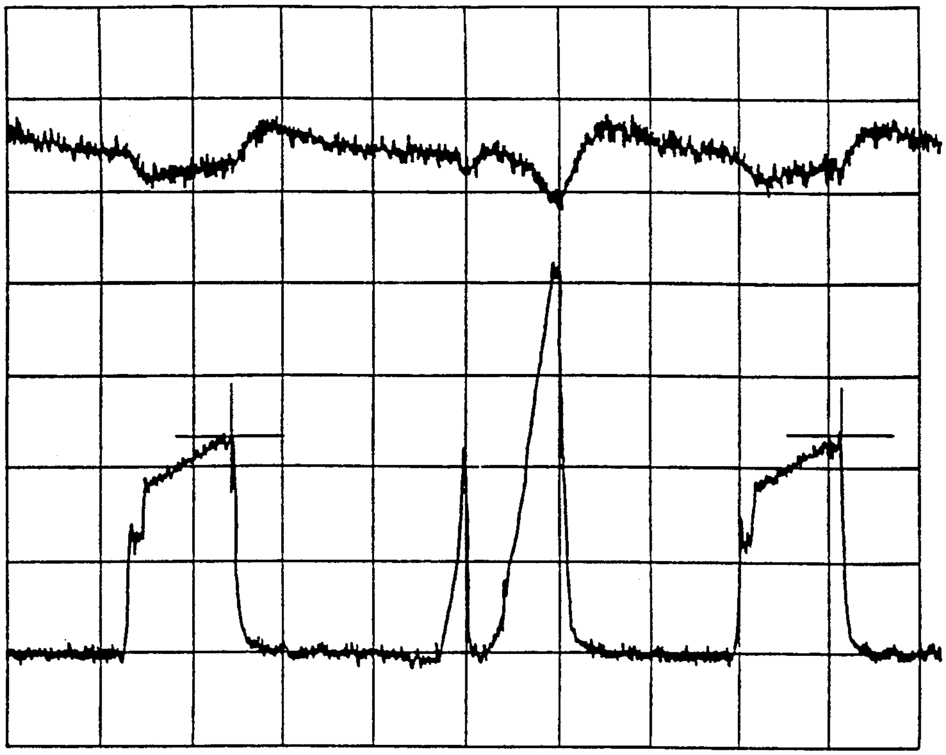
Figure 9:
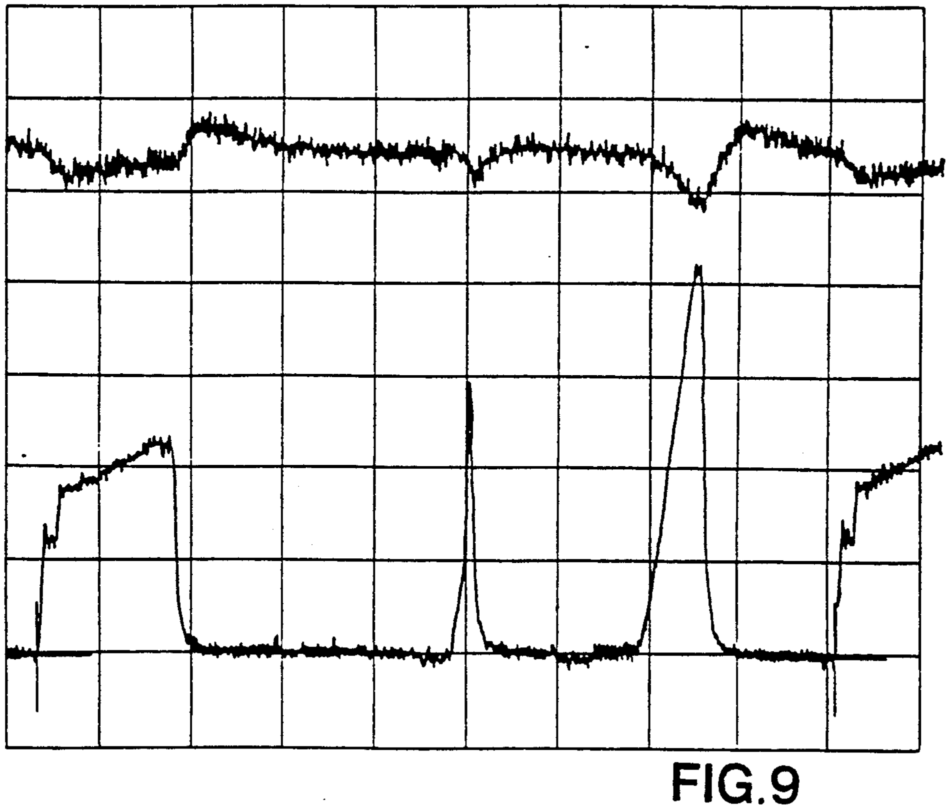

With reference to FIGS. 8 and 9, the units of measurement indicated on the axis of the ordinates are the same as in FIGS. 6 and 7, while the unit of measurement indicated on the axis of the abscissas is equal to 0.5 seconds. The value of the pressures is taken along the delivery line 19. The pressing cycle initially has a rise in pressure in order to fully charge the accumulator 41 of the auxiliary devices, followed by the first and second pressing strokes, after which the cycle ends and a new cycle resumes. In particular, in FIG. 8 the first and second pressing strokes are close to one another, whereas in FIG. 9 they are spaced in time. Even when the first and second pressing stroke are close, this does not entail a significant decrease in the flywheel's angular speed.

With reference to FIGS. 10 and 11, the unit of measurement indicated on the axis of the ordinates is 140 bar, and the unit of measurement indicated on the axis of the abscissas is 1 second. The curves located in the lower part of each figure are pressure levels taken along the delivery line 19, while the curves located in the upper part of each figure are simultaneous corresponding pressure values taken along the high-pressure line 23.

With reference to FIGS. 6 to 11, there is clearly shown that the duration of the closure of the first valve means 20 determines the intensity of the pressure reached in the hydraulic actuation means 10. In fact, when the duration of the closure is short, the pressure reached in the hydraulic actuation means 10 is relatively low; when the duration is long the pressure is relatively high.

In practice it has been observed that the apparatus is very flexible and is adaptable to various work conditions, configuring the pressing cycle for example so as to perform multiple consecutive pressings, at rising pressures, of the same body to be machined.

The invention is susceptible to numerous modifications or variations, all of which are within the scope of the same inventive concept; thus for example the control unit may be less elaborate, renouncing the database, closed-loop adjustments and programmability. The means for memorizing the speed, temperature and pressure level values may be constituted by manually settable potentiometers. The levels may be detected with movable proximity sensors. The operating cycle may be provided with dedicated or composite microcircuits, in a less flexible manner but sufficient for many cases of application.

What is claimed is:

1. A hydraulic circuit for feeding a pressurized liquid flow to hydraulic actuation means by means of check valve means open towards said hydraulic actuation means, comprising:

a positive-displacement pump which has a flywheel for storing kinetic energy;

an actuation motor for said positive-displacement pump;

first valve means for discharging to a tank a liquid flow from said positive-displacement pump so that said hydraulic actuation means are actuated by closing said first valve means; and control means to control a speed of an opening stroke of a poppet of said first valve means;

wherein said flywheel accumulates kinetic energy during opening of said first valve means and yields kinetic energy during closing of said first valve means.

2. A hydraulic circuit according to claim 1 in which said control means connects a pilot line of said first valve means with said poppet and comprises: secondary throttling means to control an opening speed of said poppet; and a check valve means, open towards said poppet, arranged in parallel to said secondary throttling means, to allow high speed closing of said poppet.

3. A hydraulic circuit according to claim 2 in which said connection between said pilot line and said poppet comprises a pressure control valve connected to a tank.

4. A hydraulic circuit according to claim 1 comprising a check valve means, open towards said hydraulic actuation means, connecting said pump with said hydraulic actuation means.

5. A hydraulic circuit according to claim 4 in which a pressure sensor is connected to a delivery line arranged between said pump and said check valve means.

6. A hydraulic circuit according to claim 1 in which said pump has a fixed displacement.

7. A hydraulic circuit according to claim 4 in which said first valve means is connected to a delivery line arranged between said pump and said check valve.

8. A hydraulic circuit according to claim 1 in which said first valve means is a directional control type valve.

9. A hydraulic circuit according to claim 1 in which said first valve means comprise a poppet which is slidable inside a seat, so as to close a liquid passage opening with a force which is generated by a pilot pressure of a pilot line fed by said pump, said liquid passage opening lying on a plane which is perpendicular to a movement of said poppet.

10. A hydraulic circuit according to claim 1 wherein said pilot line is fed by a bistable valve having one input connected to a hydraulic accumulator and another input connected to a delivery line of said pump; and wherein an input at higher pressure determines a pilot pressure.

11. A hydraulic circuit according to claim 1, said hydraulic actuation means having movable ram means for exerting pressure on bodies to be processed.

12. A hydraulic circuit according to claim 2, said hydraulic actuation means having movable ram means for exerting pressure on bodies to be processed.

13. A hydraulic circuit according to claim 4, said hydraulic actuation means having movable ram means for exerting pressure on bodies to be processed.

14. A hydraulic circuit according to claim 5, said hydraulic actuation means having movable ram means for exerting pressure on bodies to be processed.

15. A hydraulic circuit according to claim 6, said hydraulic actuation means having movable ram means for exerting pressure on bodies to be processed.

16. A hydraulic circuit according to claim 7, said hydraulic actuation means having movable ram means for exerting pressure on bodies to be processed.

17. A hydraulic circuit according to claim 9, said hydraulic actuation means having movable ram means for exerting pressure on bodies to be processed.

18. An apparatus according to claim 1, further comprising:

a movable ram actuated by said hydraulic actuation means; and a body to be processed by pressing, using said hydraulic ram, the body selected from the group consisting of powder and granules.

19. An apparatus according to claim 2, further comprising:

a movable ram actuated by said hydraulic actuation means; and a body to be processed by pressing, using said hydraulic ram, the body selected from the group consisting of powder and granules.

20. An apparatus according to claim 7, further comprising:

a movable ram actuated by said hydraulic actuation means; and a body to be processed by pressing, using said hydraulic ram, the body selected from the group consisting of powder and granules.

21. A hydraulic circuit for feeding a pressurized liquid flow to hydraulic actuation means, comprising:

a positive displacement pump which has a flywheel for storing kinetic energy and which operates with a direction of flow directed towards a delivery line;

an actuation motor for said positive-displacement pump;

first valve means for discharging to a tank a liquid flow from said positive-displacement pump;

a poppet for said first valve means which is slidable inside a seat, so as to close a liquid passage opening with a force which is generated by a pilot pressure of a pilot line; and two inputs for said pilot line which are connected one to a hydraulic accumulator and the other one to said delivery line, the input at higher pressure determining said pilot pressure;

wherein said hydraulic actuation means are actuated by closing said first valve means; and wherein said flywheel accumulates kinetic energy during opening of said first valve means and yields kinetic energy during closing of said first valve means.

22. A hydraulic circuit according to claim 21 in which said liquid passage opening lies on a plane which is perpendicular to a movement of said poppet.

23. A hydraulic circuit according to claim 21 in which said pump has a fixed displacement.

24. A hydraulic circuit according to claim 21 for exerting pressure on bodies to be processed, said hydraulic actuation means having movable ram means for exerting pressure on bodies to be processed.

25. An apparatus according to claim 24, further comprising:

a body to be processed by pressing, using said hydraulic actuation means, the body selected from the group consisting of powder and granules.

26. A hydraulic circuit for feeding a pressurized liquid flow to hydraulic actuation means comprising:

a positive-displacement pump which has a flywheel for storing kinetic energy and which operates with a direction of flow directed towards a delivery line;

an actuation motor for said positive-displacement pump;

first valve means for discharging to a tank a liquid flow from said positive-displacement pump;

a remotely controllable distribution valve unit connected with said delivery line; and a plurality of pressure lines connected with said distribution valve unit;

wherein said hydraulic actuation means are actuated by closing said first valve means;

wherein said flywheel accumulates kinetic energy during opening of said first valve means and yields kinetic energy during closing of said first valve means; and wherein one of said pressure lines is connected with said hydraulic actuation means.

27. A hydraulic circuit according to claim 26, in which said distribution valve unit comprises two dedicated valve means for directional control connected to said delivery line; each of said dedicated valve means being connected to a particular one of said pressure lines, and being controlled with a dedicated pilot line to open and close said particular pressure line.

28. A hydraulic circuit according to claim 27 in which said distribution valve unit comprises check valve means open towards said hydraulic actuation means and closed towards said delivery line.

29. A hydraulic circuit according to claim 28 in which a pressure sensor is arranged between said positive displacement pump and said check valve means.

30. A hydraulic circuit according to claim 26 comprising memory means to allow to memorize a plurality of different pressure thresholds, so that at least one pressure threshold corresponds to each of said pressure lines; a combined control of said distribution valve unit and of said first valve means allowing to load said pressure lines each at a different pressure, corresponding to a respective one of said pressure thresholds.

31. A hydraulic circuit according to claim 27, comprising control means to control a speed of an opening stroke of a poppet of said first valve means.

32. A hydraulic circuit according to claim 26 in which one of said pressure lines is connected with a hydraulic accumulator.

33. A hydraulic circuit according to claim 26 which said first valve means is connected to said delivery line.

34. A hydraulic circuit according to claim 27 in which said first valve means and said dedicated valve means are a directional control type valve means.

35. A hydraulic circuit according to claim 34 in which said first valve means and said dedicated valve means comprise a poppet which is slidable inside a seat, so as to close a liquid passage opening with a force which is generated by a pilot pressure of a pilot line, said liquid passage opening lying on a plane which is perpendicular to a movement of said poppet.

36. A hydraulic circuit according to claim 26 for exerting pressure on bodies to be processed, said hydraulic actuation means having movable ram means for exerting pressure on bodies to be processed.

37. A hydraulic circuit according to claim 27 for exerting pressure on bodies to be processed, said hydraulic actuation means having movable ram means for exerting pressure on bodies to be processed.

38. A hydraulic circuit according to claim 30 for exerting pressure on bodies to be processed, said hydraulic actuation means having movable ram means for exerting pressure on bodies to be processed.

39. A hydraulic circuit according to claim 32 for exerting pressure on bodies to be processed, said hydraulic actuation means having movable ram means for exerting pressure on bodies to be processed.

40. A hydraulic circuit according to claim 33 for exerting pressure on bodies to be processed, said hydraulic actuation means having movable ram means for exerting pressure on bodies to be processed.

41. A hydraulic circuit according to claim 35 for exerting pressure on bodies to be processed, said hydraulic actuation means having movable ram means for exerting pressure on bodies to be processed.

42. An apparatus according to claim 36, further comprising:

a body to be processed by pressing, using said hydraulic actuation means, the body selected from the group consisting of powder and granules.

43. An apparatus according to claim 37, further comprising:

a body to be processed by pressing, using said hydraulic actuation means, the body selected from the group consisting of powder and granules.

* * * * *

UNITED STATES PATENT AND TRADEMARK OFFICE
CERTIFICATE OF CORRECTION

PATENT NO. : 5,325,668
DATED : July 5, 1994
INVENTOR(S) : Walchhutter et al.

It is certified that error appears in the above-indentified patent and that said Letters Patent is hereby corrected as shown below:

On title page, under the sub-heading "[*] Notice:", the entire notice is replaced with the following:

-- The portion of the term of this patent subsequent to October 27, 2009 has been disclaimed. --

Signed and Sealed this

Thirty-first Day of January, 1995

Attest:

BRUCE LEHMAN

*Attesting Officer* *Commissioner of Patents and Trademarks*